US012565227B1

(12) United States Patent
　　Kulkarni

(10) Patent No.:　US 12,565,227 B1
(45) Date of Patent:　　Mar. 3, 2026

(54) SYSTEMS AND METHODS FOR REAR VOICE RECOGNITION (VR) CONFLICT MONITORING TO REDUCE DRIVE DISTRACTION

(71) Applicants:Hyundai Motor Company, Seoul (KR); Kia Corporation, Seoul (KR)

(72) Inventor: Ashwin Kulkarni, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/824,451

(22) Filed: Sep. 4, 2024

(51) Int. Cl.
　　*B60W 50/14*　　　　(2020.01)
　　*B60W 40/08*　　　　(2012.01)
(52) U.S. Cl.
　　CPC ............ *B60W 50/14* (2013.01); *B60W 40/08* (2013.01); *B60W 2050/146* (2013.01); *B60W 2420/54* (2013.01); *B60W 2540/21* (2020.02)
(58) Field of Classification Search
　　None
　　See application file for complete search history.

(56) References Cited

U.S. PATENT DOCUMENTS

| | | | |
|---|---|---|---|
| 9,947,528 B2 | 4/2018 | Zhu et al. | |
| 12,227,197 B2 * | 2/2025 | Oba | B60W 50/08 |
| 12,246,676 B2 * | 3/2025 | Sharifi | G06F 21/32 |
| 2017/0108348 A1 * | 4/2017 | Hansen | H04W 4/024 |
| 2018/0216958 A1 * | 8/2018 | Park | G06Q 30/0241 |
| 2020/0047687 A1 * | 2/2020 | Camhi | G10L 15/22 |
| 2020/0135190 A1 * | 4/2020 | Kaja | G10L 15/22 |
| 2020/0160861 A1 | 5/2020 | Lee | |

* cited by examiner

*Primary Examiner* — Muhammad Adnan
(74) *Attorney, Agent, or Firm* — Fox Rothschild LLP

(57)　　　　　ABSTRACT

Systems and methods for providing rear voice recognition (VR) conflict monitoring are provided. The method may comprise receiving one or more VR inputs and, using a computing device, determining whether the one or more VR inputs trigger one or more driver actions or passenger actions, determining whether a driver action is related to a number of one or more passenger actions and is part of a tracked action list, determining whether the driver action contradicts the one or more passenger actions, for each passenger action, increasing a positive index when the passenger action does not contradict the driver action and increasing a negative index when the passenger action contradicts the driver action, calculating a trigger index by subtracting the negative index from the positive index, and prompting a driver to disable a portion of a VR system when the trigger index is less than a threshold.

20 Claims, 6 Drawing Sheets

SYSTEMS AND METHODS FOR REAR VOICE RECOGNITION (VR) CONFLICT MONITORING TO REDUCE DRIVE DISTRACTION

BACKGROUND

Technical Field

Embodiments of the present disclosure relate to voice recognition systems and methods and, in particular, to systems and methods for rear VR conflict monitoring to reduce driver distraction.

Background

Vehicles may comprise voice recognition (VR) systems configured to recognize one or more voice inputs and perform one or more functions based on the one or more voice inputs.

VR systems generally comprise one speaker. The one speaker is usually configured to receive VR input from the driver. Some vehicles may comprise voice recognition (VR) systems comprising multiple VR microphones for recognizing voices in different seating positions. These VR systems receive inputs from the driver and from the passengers. Some vehicles support VR activation with wake-up word/ PTT button(s) from multiple seat positions.

Some VR systems may be configured to recognize the source of the voice (i.e., the location of the speaker) based on seat position (i.e., spatial position). However, this is not failsafe, and multiple people may speak at once. In such cases, there is a scenario where multiple users will try to talk to VR systems, thus causing stress for the driver. For example, multiple passengers in the back seat of the vehicle trying to change the radio station through the VR system.

In some instances, passenger VR input may contradict driver VR input. For example, the driver may use the VR system to change the radio station and then a passenger may use the VR system to change the radio station back. These conflicting voice commands can distract the driver.

Existing VR systems do not detect if the passenger's VR input supports the driver's VR input or contradicts the driver's VR input. For example, when the driver's VR input changes the radio station, the passenger's VR input may support the driver's VR input when the passenger's VR input increases the volume of the radio, and the passenger's VR input may contradict the driver's VR input when the passenger's VR input changes the radio station back.

In present systems and methods, in order for a driver to disable/enable the rear VR system fully, the driver has to open the options manually and enable/disable features. This also can be distracting to the driver.

Therefore, for at least these reasons, VR systems and methods which reduce driver distraction and improve driver experience are needed.

SUMMARY

According to an object of the present disclosure, a method for providing rear voice recognition (VR) conflict monitoring is provided. The method may comprise receiving, using one or more microphones coupled to a vehicle, one or more VR inputs. The method may comprise, using a computing device comprising a processor, a memory, and a graphical user interface, determining whether the one or more VR inputs trigger one or more driver actions or passenger actions, when one or more passenger actions and a driver action are triggered, determining whether the driver action is related to a number of the one or more passenger actions and is part of a tracked action list, when the driver action is related to the number of the one or more passenger actions and is part of the tracked action list, determining whether the driver action contradicts the one or more passenger actions, and, for each passenger action, increasing a positive index when the passenger action does not contradict the driver action, and increasing a negative index when the passenger action contradicts the driver action. The method may comprise, using the computing device, calculating a trigger index by subtracting the negative index from the positive index, and prompting a driver to disable a portion of a VR system when the trigger index is less than a threshold, via a prompt presented to the driver using the graphical user interface.

According to an exemplary embodiment, the method may further comprise, using the computing device, when a passenger action is triggered, starting a timer having a set timeout time, determining whether the timer has timed out at the timeout time, and, when the timer has timed out, resetting the positive index and the negative index.

According to an exemplary embodiment, the method may comprise resetting the positive index and the negative index when the driver action is not related to the number of the one or more passenger actions, or the driver action is not part of a tracked action list.

According to an exemplary embodiment, the portion of the VR system may conform to a rear of the vehicle.

According to an exemplary embodiment, the method may comprise retrieving the tracked action list.

According to an exemplary embodiment, the tracked action list may be customized for the driver.

According to an exemplary embodiment, the method may comprise resetting the positive index and the negative index prior to determining whether the one or more VR inputs trigger one or more driver actions or passenger actions.

According to an exemplary embodiment, the method may comprise, prior to subtracting the negative index from the positive index, multiplying the negative index by a set weightage.

According to an exemplary embodiment, the method may comprise, prior to subtracting the negative index from the positive index, multiplying the positive index by a set weightage.

According to an exemplary embodiment, the method may comprise, using the computing device, receiving a response from the driver to the prompt, and when the response from the driver is in the affirmative, disabling the portion of the VR system.

According to an object of the present disclosure, a system for providing rear VR conflict monitoring is provided. The system may comprise one or more microphones coupled to a vehicle, configured to receive one or more VR inputs, and a computing device, comprising a processor a memory, and a graphical user interface. The memory may be configured to store instructions that, when executed by the processor, are configured to cause the processor to determine whether the one or more VR inputs trigger one or more driver actions or passenger actions, when one or more passenger actions and a driver action are triggered, determine whether the driver action is related to a number of the one or more passenger actions and is part of a tracked action list, when the driver action is related to the number of the one or more passenger actions and is part of the tracked action list, determine whether the driver action contradicts the one or more passenger actions, and, for each passenger action, increase a positive index when the passenger action does not contradict the driver action and increase a negative index when the passenger action contradicts the driver action. The instructions, when executed by the processor, may be further configured to cause the processor to calculate a trigger index by subtracting the negative index from the positive index, and prompt a driver to disable a portion of a VR system when the trigger index is less than a threshold, via a prompt presented to the driver using the graphical user interface.

According to an exemplary embodiment, the instructions, when executed by the processor, may be configured to cause the processor to, when a passenger action is triggered, start a timer having a set timeout time, determine whether the timer has timed out at the timeout time, and, when the timer has timed out, reset the positive index and the negative index.

According to an exemplary embodiment, the instructions, when executed by the processor, may be configured to cause the processor to reset the positive index and the negative index when the driver action is not related to the number of the one or more passenger actions, or the driver action is not part of a tracked action list.

According to an exemplary embodiment, the portion of the VR system may conform to a rear of the vehicle.

According to an exemplary embodiment, the instructions, when executed by the processor, may be configured to cause the processor to retrieve the tracked action list.

According to an exemplary embodiment, the tracked action list may be customized for the driver.

According to an exemplary embodiment, the instructions, when executed by the processor, may be configured to cause the processor to reset the positive index and the negative index prior to determining whether the one or more VR inputs trigger one or more driver actions or passenger actions.

According to an exemplary embodiment, the instructions, when executed by the processor, may be configured to cause the processor to, prior to subtracting the negative index from the positive index, multiply the negative index by a set negative index weightage, and multiply the positive index by a set positive index weightage.

According to an exemplary embodiment, the instructions, when executed by the processor, may be configured to cause the processor to receive a response from the driver to the prompt, and, when the response from the driver is in the affirmative, disable the portion of the VR system.

According to an exemplary embodiment, the system may comprise the vehicle.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
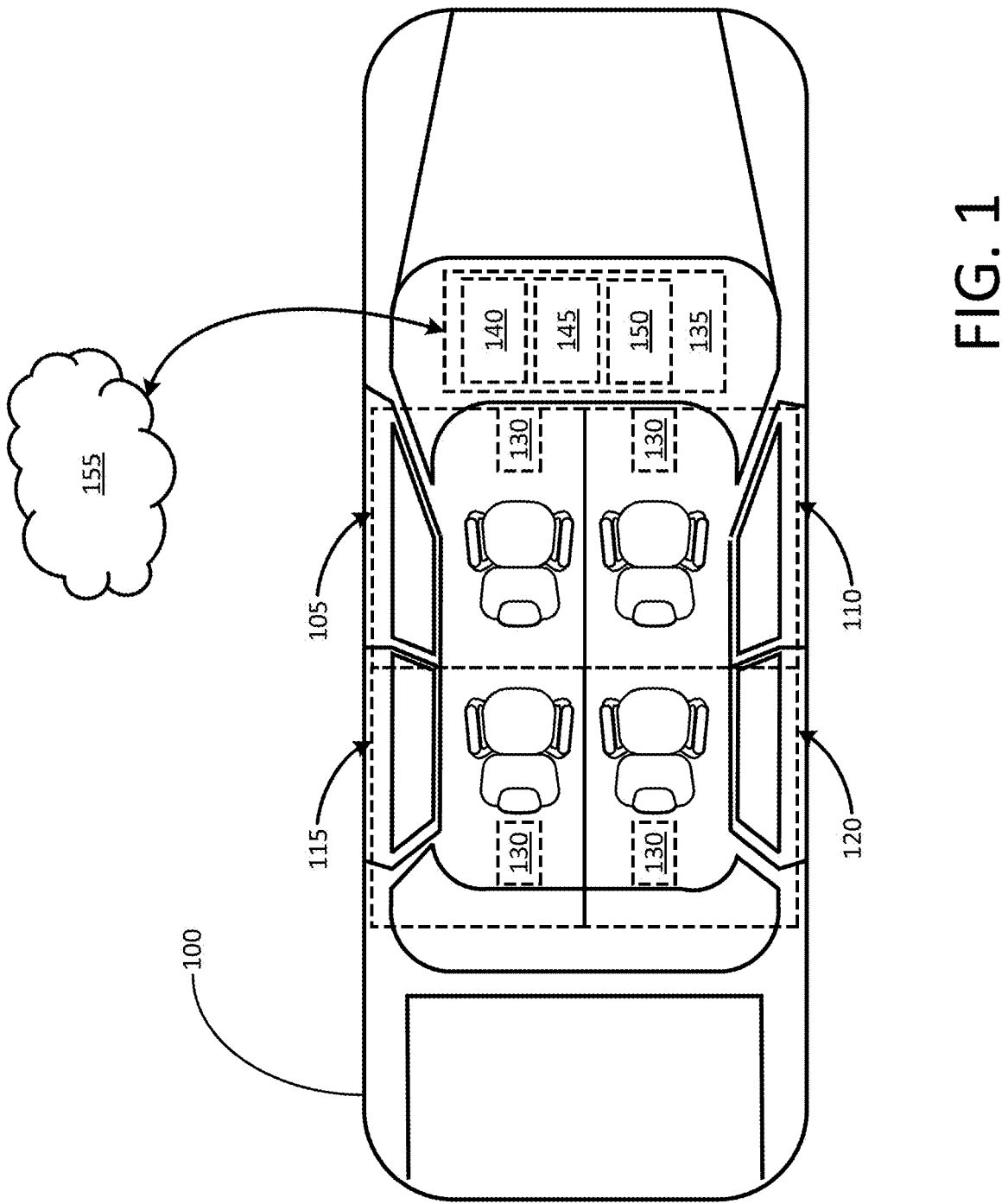
FIG. 1 illustrates a vehicle configured for providing rear voice recognition (VR) conflict monitoring, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

According to exemplary embodiments, systems and methods for rear voice recognition (VR) conflict monitoring to reduce driver distraction are provided.

Referring now to FIG. 1, a vehicle 100 configured for providing systems and methods for rear VR conflict monitoring to reduce driver distraction is illustratively depicted, in accordance with an exemplary embodiment of the present disclosure.

According to an exemplary embodiment, the vehicle 100 may comprise an electric vehicle and/or other suitable vehicle. It is noted that, while the vehicle 100 is illustrated as an automobile, the vehicle may comprise other vehicles such as, e.g., buses, trains, planes, boats, and/or other suitable vehicles.

According to an exemplary embodiment, the vehicle 100 may be divided into one or more zones (e.g., zone 105, zone 110, zone 115, and zone 120). According to an exemplary embodiment, zone 105 may be designated for a driver, and zones 115 and 120 may be designated as a rear of the vehicle 100. It is noted, however, that the vehicle 100 may have greater or fewer numbers of zones and/or placements for the driver and/or the rear of the vehicle 100. According to an exemplary embodiment, the vehicle 100 may comprise one zone for each seat 125 in the vehicle 100.

According to an exemplary embodiment, each zone may comprise one or more microphones 130 configured to pick up audio from one or more passengers. The audio may comprise VR input.

According to an exemplary embodiment, the vehicle 100 may comprise one or more computing devices 135. The one or more computing devices 135 may be separate from the one or more microphones 130 and/or may be incorporated into and/or coupled to the one or more microphones 130. According to an exemplary embodiment, the vehicle 100 may comprise one or more VR systems comprising the one or more computing devices 135 and/or the one or more microphones 130.

According to an exemplary embodiment, one or more of the one or more computing devices 135 may comprise a processor 140, a memory 145, and/or a user interface 150 (e.g., a graphical user interface). According to an exemplary embodiment, the user interface 150 may comprise one or more head up (HU) displays configured to display data (e.g., images, words, etc.) to the driver.

The computing device 135 may be configured to send and/or receive commands/data/etc. via one or more external systems via wired and/or wireless connection (e.g., via the cloud 155). The memory 145 may be configured to store programming instructions that, when executed by the processor 140, may be configured to cause the processor 140 to perform one or more tasks such as, e.g., receiving one or more VR inputs, determining whether each of the one or more VR inputs are a driver VR input or a passenger VR input, determining whether a passenger VR input is opposite to a driver VR input, increasing a positive index when the passenger VR input is not opposite to the driver VR input, increasing a negative index when the passenger VR input is opposite to the driver VR input, calculating a trigger index by subtracting the negative index from the positive index, prompting the driver to disable the rear VR when the trigger index is less than a threshold, receiving a VR input from the driver to disable the rear VR, and/or performing one or more other suitable tasks.

According to an exemplary embodiment, the trigger index tracks over time whether one or more actions of the passenger VR input agree with one or more actions of the driver VR input and/or are opposite/disagree with one or more actions of the driver VR input.

According to an exemplary embodiment, the positive index increases when an action of the passenger VR input agrees with/supports the driver VR input.

According to an exemplary embodiment, the negative index increases when an action of the passenger VR input contradicts/disagrees with an action of the driver VR input.

Figure 2A:
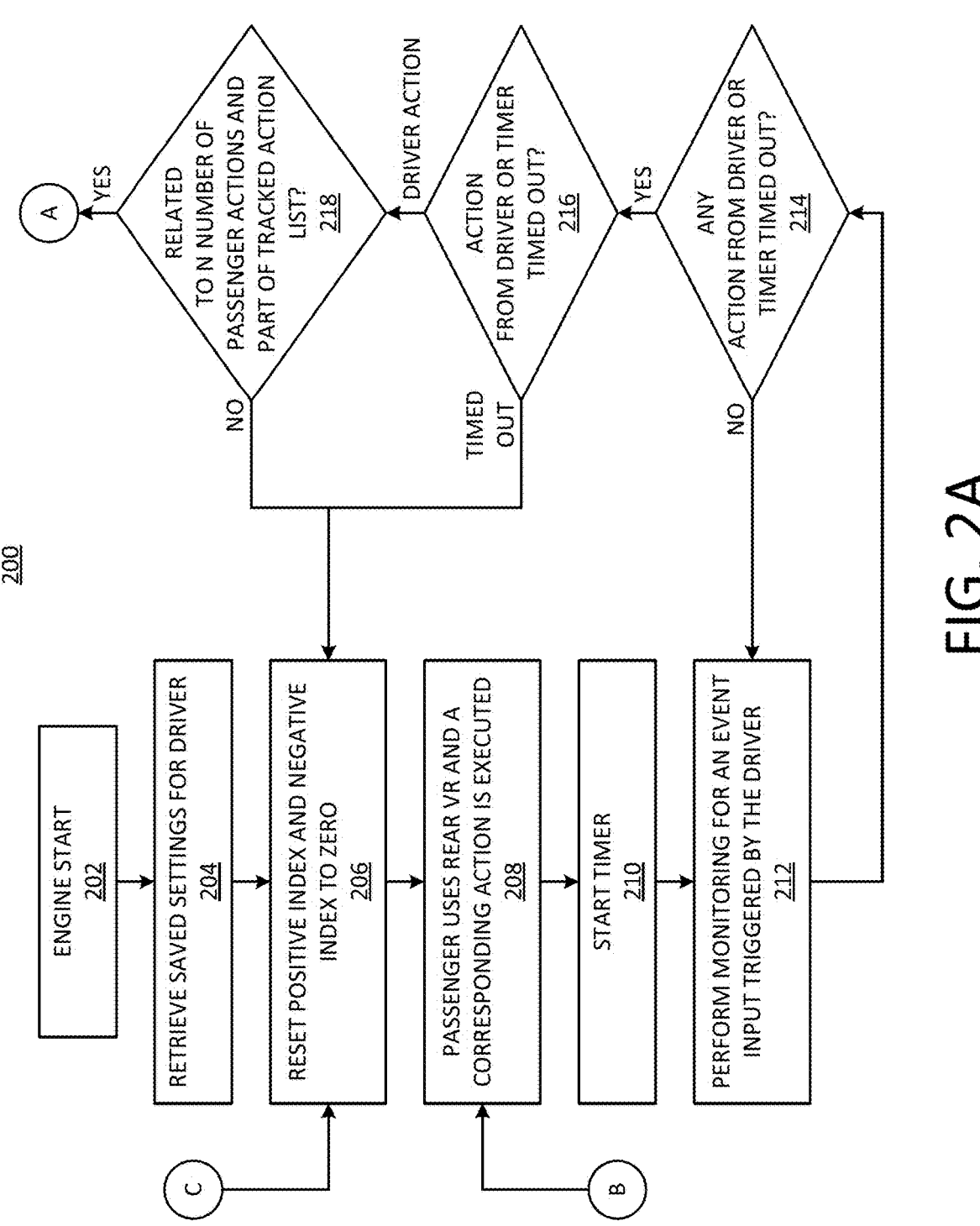
FIGS. 2A-2B illustrate a flowchart of a method for providing rear VR conflict monitoring, according to an exemplary embodiment of the present disclosure.
Figure 2B:
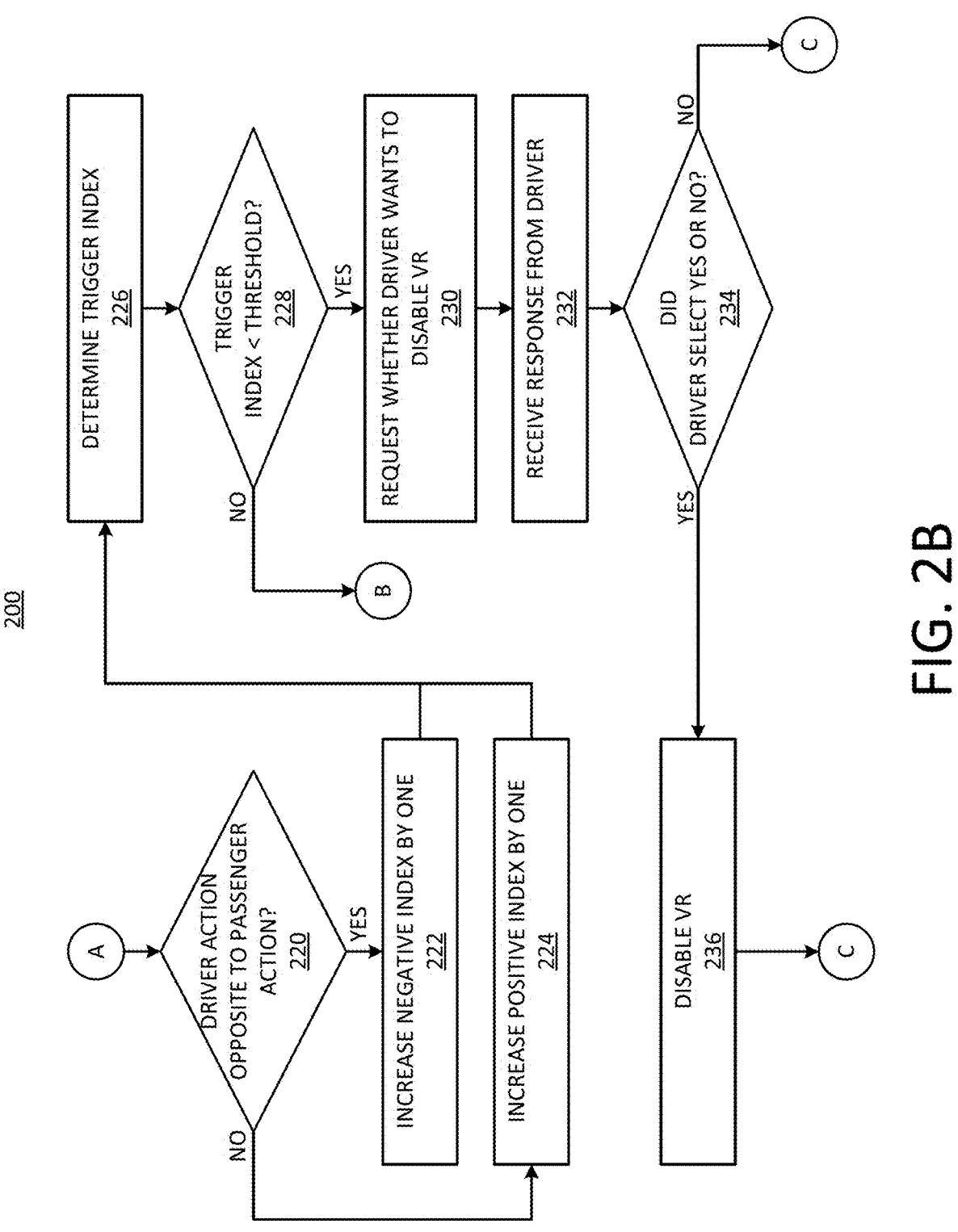

Referring now to FIGS. 2A-2B, a flowchart of a method 200 for providing systems and methods for rear VR conflict monitoring to reduce driver distraction is illustratively depicted, in accordance with an exemplary embodiment of the present disclosure.

At 202, a vehicle may be started. For example, a vehicle engine may be started.

At 204, one or more saved settings may be retrieved for the driver. According to an exemplary embodiment, the one or more saved settings may comprise a list of conflicting actions which are to be tracked. According to an exemplary embodiment, one or more predefined patterns may be stored in the system during boot up to compare the patterns. Conflicting patterns may be executed from rear VR may comprise radio frequency changes, navigation address setting attempts, address/contact names, and/or other suitable conflicting patterns. According to an exemplary embodiment, the tracked action list may be customized for each driver. According to an exemplary embodiment, the one or more predefined patterns may comprise one or more default patterns, one or more patterns learned from machine learning, one or more patterns input by the driver or other suitable user, and/or one or more patterns input by other suitable means. According to an exemplary embodiment, the one or more patterns may comprise one or more positive scenarios (e.g., when an action triggered by the input from the driver is supportive to a passenger action) and/or one or more negative scenarios (e.g., when an action triggered by the input from the driver is opposite to/contradicts a passenger action).

According to an exemplary embodiment, the system may be configured to recognize one or more patterns and form appropriate actions to the driver based on the one or more patterns detected and the one or more users detected who are creating these patterns These actions may be displayed on a screen for the driver to view, and the driver may be enabled to take any action which is felt correct in this situation.

At 206, a positive index and a negative index may be reset to zero.

At 208, one or more passengers may use rear VR (i.e., may use the VR system by speaking into the microphones in the rear of the vehicle) and a corresponding action may be executed by the vehicle (e.g., by the one or more computing devices). According to an exemplary embodiment, the corresponding action may be displayed on the user interface. According to an exemplary executing the corresponding action may comprise identifying a passenger VR input and determining whether an action (the passenger action) is triggered by the passenger VR input.

According to an exemplary embodiment, the one or more patterns may be evaluated in a small, fixed time frame. At 210, a timer may be started. The timer may indicate an overall action window. The timer may be in seconds or other suitable unit of time, and may timeout at a threshold time, T.

At 212, monitoring may be performed for an event input (e.g., a VR event (e.g., a VR input), a human machine interface (HMI) event (e.g., an input on a touch screen), a button event, and/or other suitable event) triggered by the driver.

At 214, it may be determined whether any action has been triggered by input from the driver (i.e., a driver action) or whether the timer timeout has occurred after T seconds. When no action has been triggered by input from the driver and the timer has not timed out, then, at 212, monitoring may be performed for an event input triggered by the driver.

When an action has been triggered by input from the driver or the timer has timed out, then, at 216, it may be determined whether the action has been triggered by the input from the driver or the timer has timed out.

When the timer has timed out, then, at 206, the positive index and the negative index may be reset to zero.

When an action has been triggered by the input from the driver, then, at 218, it may be determined whether the triggered by the input from the driver relates to the last N number of passenger actions (triggered by inputs from the passenger or passengers) and is part of a tracked action list, where N is the number of passenger actions remembered in the system.

When the triggered by the input from the driver does not relate to the last N number of passenger actions and/or is not part of a tracked action list, then this is a neutral condition and, at 206, the positive index and the negative index may be reset to zero. According to an exemplary embodiment, any action which can be termed as neutral (driver does not react) after a passenger action will not add any value to the positive index or negative index.

When the action does relate to the last N number of passenger actions and is part of a tracked action list, then, at 220, it is determined whether the action triggered by the input from the driver is opposite to/contradicts the passenger action.

When the action triggered by the input from the driver is opposite to/contradicts the passenger action (i.e., is a negative action), then, at 222, the negative index is increased by one, where the negative index is a measure of rear passenger negative interference. According to an exemplary embodiment, any action in contrast to the driver's expectations may be determined to be a negative action.

When the action triggered by the input from the driver is not opposite to/contradicts the passenger action (i.e., is a positive action), then, at 224, the positive index is increased by one, where the positive index is a measure of rear passenger positive interference. According to an exemplary embodiment, any action which will be (or is) supportive of the action triggered by the input from the driver may be determined to be a positive action.

At 226, a trigger index is determined, according to Equation 1.

$$Ti = (Wp \times \text{Positive Index}) - (Wn \times \text{Negative Index}) \qquad \text{Equation 1}$$

Ti is the trigger index, Wp is a weightage given to the positive interference, and Wp is a weightage given to the negative interference. According to an exemplary embodiment, the trigger index, Ti, is a value that represents a present state of rear passenger interference.

At 228, it is determined whether the trigger index, Ti, is less than a threshold, Th, wherein the threshold, Th, is a threshold level of interference from the rear passenger(s).

When the trigger index, Ti, is not less than the threshold, Th, then, at 208, one or more passengers may use rear VR and a corresponding action may be executed by the vehicle.

Figure 3:
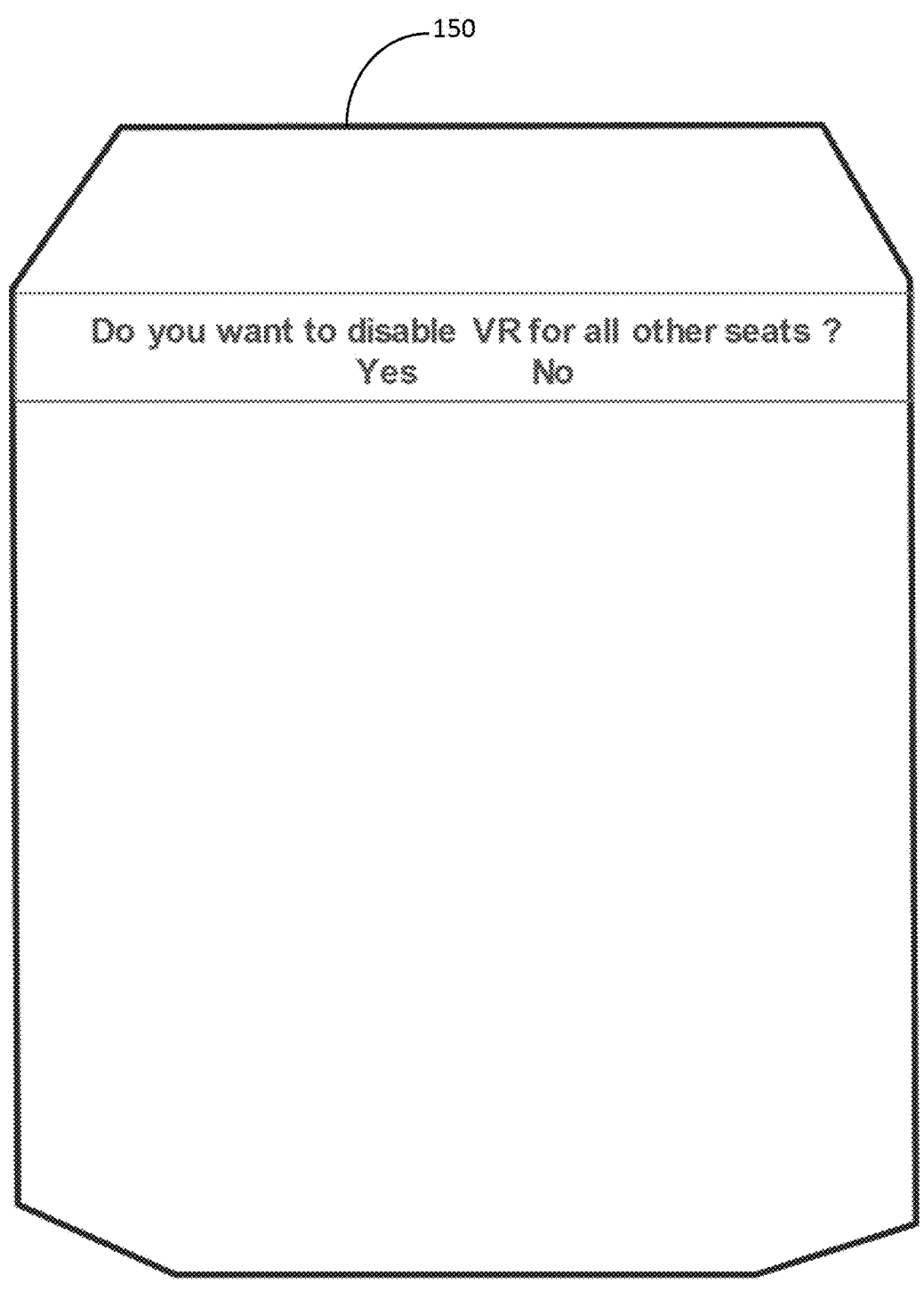
FIG. 3 illustrates an example user interface for displaying a request to a driver, according to exemplary embodiments of the present disclosure.

When the trigger index, Ti, is less than the threshold, Th, then, at 230, a pop-up may be displayed to the driver asking if the driver wants to disable rear VR (as shown, e.g., in FIG. 3). According to an exemplary embodiment, the pop-up may ask the driver if the driver wants to disable rear VR temporarily, permanently, for a set length of time, until an event occurs (e.g., until the engine is turned off), and/or for any other duration. It is noted that, while rear VR is described above, the VR to be disabled may be in an one or more zones, as appropriate.

At 232, a response from the driver may be received and, at 234, it may be determined whether the driver selected yes or no.

When the driver selects no, then, at 206, the positive index and the negative index may be reset to zero. When the driver selects yes, then, at 236, the rear VR may be disabled and, at 206, the positive index and the negative index may be reset to zero. Based on the driver's selection, VR services may be blocked for certain users or all users except for the driver. This aids in reducing driver distraction due to frequent conflicting actions (e.g., frequent changing of the radio station, or one or more points of interest (POI), etc.).

Figure 4:
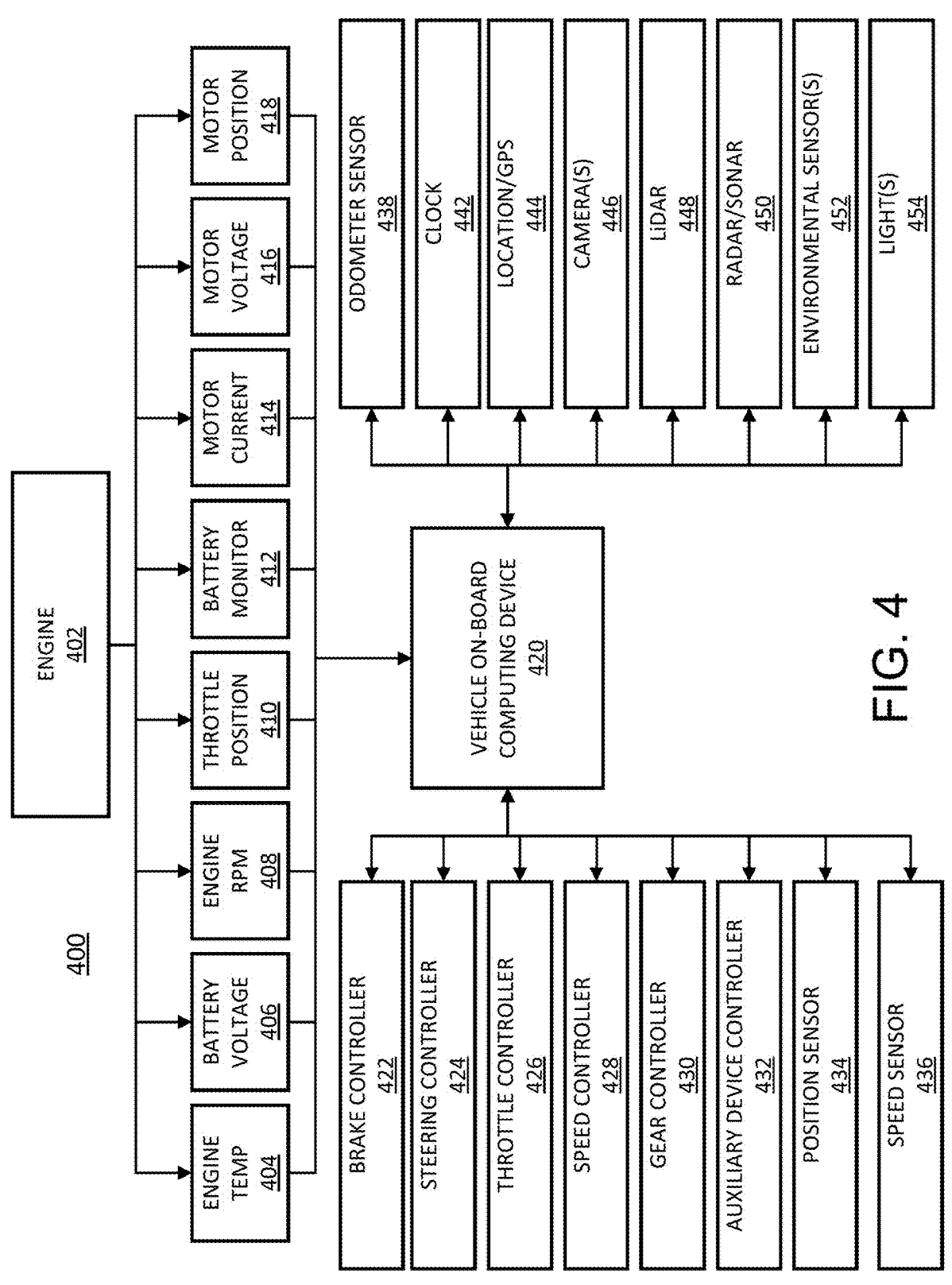
FIG. 4 illustrates an example architecture of a vehicle, according to an exemplary embodiment of the present disclosure.

Referring now to FIG. 4, an example vehicle system architecture 400 for a vehicle is provided, in accordance with an exemplary embodiment of the present disclosure. The following discussion of vehicle system architecture 400 is sufficient for understanding one or more components of vehicle 100.

As shown in FIG. 4, the vehicle system architecture 400 may comprise an engine, motor or propulsive device 402 and various sensors 404-418 for measuring various parameters of the vehicle system architecture 400. In gas-powered or hybrid vehicles having a fuel-powered engine, the sensors 404-418 may comprise, for example, an engine temperature sensor 404, a battery voltage sensor 406, an engine Rotations Per Minute (RPM) sensor 408, and/or a throttle position sensor 410. If the vehicle is an electric or hybrid vehicle, then the vehicle may comprise an electric motor, and accordingly may comprise sensors such as a battery monitoring system 412 (to measure current, voltage and/or temperature of the battery), motor current 414 and voltage 416 sensors, and motor position sensors such as resolvers and encoders 418.

Operational parameter sensors that are common to both types of vehicles may comprise, for example: a position sensor 434 such as an accelerometer, gyroscope and/or inertial measurement unit; a speed sensor 436; and/or an odometer sensor 438. The vehicle system architecture 400 also may comprise a clock 442 that the system uses to determine vehicle time and/or date during operation. The clock 442 may be encoded into the vehicle on-board computing device 420, it may be a separate device, or multiple clocks may be available.

The vehicle system architecture 400 may comprise various sensors that operate to gather information about the environment in which the vehicle is traveling. These sensors may comprise, for example: a location sensor 444 (for example, a Global Positioning System (GPS) device); object detection sensors such as one or more cameras 446; a LiDAR sensor system 448; and/or a radar and/or a sonar system 450. The sensors may comprise environmental sensors 452 such as, e.g., a humidity sensor, a precipitation sensor, a light sensor, and/or ambient temperature sensor. The object detection sensors may be configured to enable the vehicle system architecture 400 to detect objects that are within a given distance range of the vehicle in any direction, while the environmental sensors 452 may be configured to collect data about environmental conditions within the vehicle's area of travel. According to an exemplary embodiment, the vehicle system architecture 400 may comprise one or more lights 454 (e.g., headlights, flood lights, flashlights, etc.).

During operations, information may be communicated from the sensors to an on-board computing device 420 (e.g., computing device 135, computing device 500), The on-board computing device 420 may be configured to analyze the data captured by the sensors and/or data received from data providers and may be configured to optionally control operations of the vehicle system architecture 400 based on results of the analysis. For example, the on-board computing device 420 may be configured to control: braking via a brake controller 422; direction via a steering controller 424; speed and acceleration via a throttle controller 426 (in a gas-powered vehicle) or a motor speed controller 428 (such as a current level controller in an electric vehicle); a differential gear controller 430 (in vehicles with transmissions); and/or other controllers. The brake controller 422 may comprise a pedal effort sensor, pedal effort sensor, and/or simulator temperature sensor, as described herein.

Geographic location information may be communicated from the location sensor 444 to the on-board computing device 420, which may then access a map of the environment that corresponds to the location information to determine known fixed features of the environment such as streets, buildings, stop signs and/or stop/go signals. Captured images from the cameras 446 and/or object detection information captured from sensors such as LiDAR 448 may be communicated from those sensors to the on-board computing device 420. The object detection information and/or captured images may be processed by the on-board computing device 420 to detect objects in proximity to the vehicle. Any known or to be known technique for making an object detection based on sensor data and/or captured images may be used in the embodiments disclosed in this document.

Figure 5:
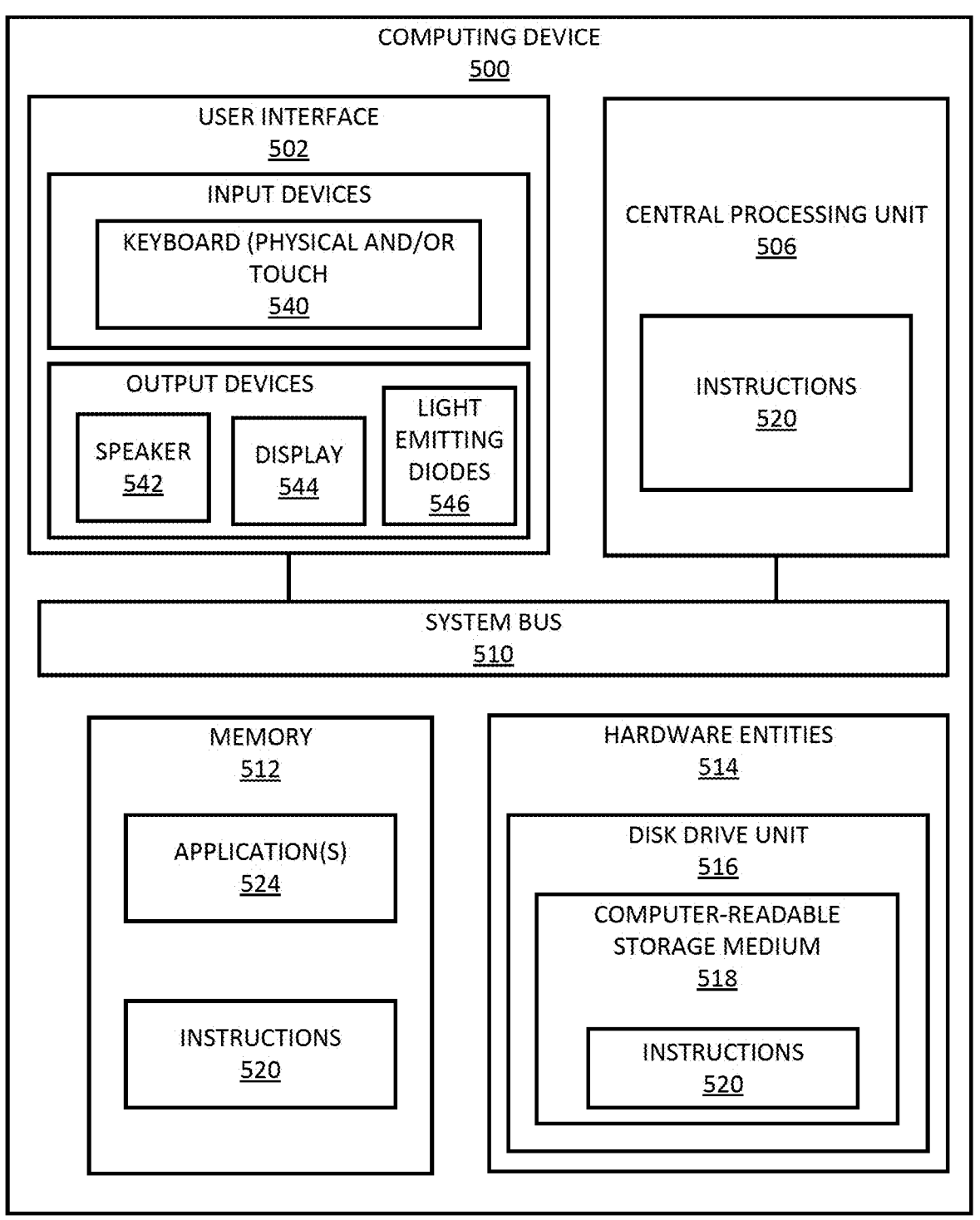
FIG. 5 illustrates example elements of a computing device, according to an exemplary embodiment of the present disclosure.

Referring now to FIG. 5, an illustration of an example architecture for a computing device 500 is provided. According to an exemplary embodiment, one or more functions of the present disclosure may be implemented by a computing device such as, e.g., computing device 500 or a computing device similar to computing device 500. Computing device 500 may be a quantum computer, a classical computer, and/or have one or more components configured to perform one or more quantum and/or classical computing functions. Computing device 135 and/or computing device 420 may be an example of computing device 500 and/or may comprise one or more components of computing device 500.

The hardware architecture of FIG. 5 represents one example implementation of a representative computing device configured to implement at least a portion of the systems/devices (e.g., vehicle 100) and method(s)/control logic(s) (e.g., method 200) described herein.

Some or all components of the computing device 500 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 5, the computing device 500 may comprise a user interface 502 (e.g., a graphical user interface), a Central Processing Unit ("CPU") 506, a system bus 510, a memory 512 connected to and accessible by other portions of computing device 500 through system bus 510, and hardware entities 514 connected to system bus 510. The user interface may comprise input devices and output devices, which may be configured to facilitate user-software interactions for controlling operations of the computing device 500. The input devices may comprise, but are not limited to, a physical and/or touch keyboard 540. The input devices may be connected to the computing device 500 via a wired or wireless connection (e.g., a Bluetooth® connection). The output devices may comprise, but are not limited to, a speaker 542, a display 544, and/or light emitting diodes 546.

At least some of the hardware entities 514 may be configured to perform actions involving access to and use of memory 512, which may be a Random Access Memory (RAM), a disk driver and/or a Compact Disc Read Only Memory (CD-ROM), among other suitable memory types. Hardware entities 514 may comprise a disk drive unit 516 comprising a computer-readable storage medium 518 on which may be stored one or more sets of instructions 520 (e.g., programming instructions such as, but not limited to, software code) configured to implement one or more of the methodologies, procedures, or functions described herein. The instructions 520 may also reside, completely or at least partially, within the memory 512 and/or within the CPU 506 during execution thereof by the computing device 500.

The memory 512 and the CPU 506 may also constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding, or carrying a set of instructions 520 for execution by the computing device 500 and that cause the computing device 500 to perform any one or more of the methodologies of the present disclosure. According to various embodiments, one or more computer applications 524 may be stored on the memory 512.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed:

1. A method for providing rear voice recognition (VR) conflict monitoring, comprising:
   receiving, using one or more microphones coupled to a vehicle, one or more VR inputs; and
   using a computing device, comprising a processor, a memory, and a graphical user interface:
       determining whether the one or more VR inputs trigger one or more driver actions or passenger actions;
       when one or more passenger actions and a driver action are triggered, determining whether the driver action is related to a number of the one or more passenger actions and is part of a tracked action list;
       when the driver action is related to the number of the one or more passenger actions and is part of the tracked action list, determining whether the driver action contradicts the one or more passenger actions;
       for each passenger action:
           increasing a positive index when the passenger action does not contradict the driver action; and
           increasing a negative index when the passenger action contradicts the driver action;
       calculating a trigger index by subtracting the negative index from the positive index; and
       prompting a driver to disable a portion of a VR system when the trigger index is less than a threshold, via a prompt presented to the driver using the graphical user interface.

2. The method of claim 1, further comprising, using the computing device:
   when a passenger action is triggered, starting a timer having a set timeout time;
   determining whether the timer has timed out at the timeout time; and
   when the timer has timed out, resetting the positive index and the negative index.

3. The method of claim 1, further comprising resetting the positive index and the negative index when:
   the driver action is not related to the number of the one or more passenger actions; or
   the driver action is not part of a tracked action list.

4. The method of claim 1, wherein the portion of the VR system conforms to a rear of the vehicle.

5. The method of claim 1, further comprising retrieving the tracked action list.

6. The method of claim 1, wherein the tracked action list is customized for the driver.

7. The method of claim 1, further comprising resetting the positive index and the negative index prior to determining whether the one or more VR inputs trigger one or more driver actions or passenger actions.

8. The method of claim 1, further comprising, prior to subtracting the negative index from the positive index, multiplying the negative index by a set weightage.

9. The method of claim 1, further comprising, prior to subtracting the negative index from the positive index, multiplying the positive index by a set weightage.

10. The method of claim 1, further comprising, using the computing device:
   receiving a response from the driver to the prompt; and
   when the response from the driver is in the affirmative, disabling the portion of the VR system.

11. A system for providing rear voice recognition (VR) conflict monitoring, comprising:

one or more microphones coupled to a vehicle, configured to receive one or more VR inputs; and a computing device, comprising a processor, a memory, and a graphical user interface, wherein the memory is configured to store instructions that, when executed by the processor, are configured to cause the processor to:

determine whether the one or more VR inputs trigger one or more driver actions or passenger actions;

when one or more passenger actions and a driver action are triggered, determine whether the driver action is related to a number of the one or more passenger actions and is part of a tracked action list;

when the driver action is related to the number of the one or more passenger actions and is part of the tracked action list, determine whether the driver action contradicts the one or more passenger actions;

for each passenger action:

increase a positive index when the passenger action does not contradict the driver action; and increase a negative index when the passenger action contradicts the driver action;

calculate a trigger index by subtracting the negative index from the positive index; and prompt a driver to disable a portion of a VR system when the trigger index is less than a threshold, via a prompt presented to the driver using the graphical user interface.

12. The system of claim 11, wherein the instructions, when executed by the processor, are further configured to cause the processor to:

when a passenger action is triggered, start a timer having a set timeout time;

determine whether the timer has timed out at the timeout time; and when the timer has timed out, reset the positive index and the negative index.

13. The system of claim 11, wherein the instructions, when executed by the processor, are further configured to cause the processor to reset the positive index and the negative index when:

the driver action is not related to the number of the one or more passenger actions; or the driver action is not part of a tracked action list.

14. The system of claim 11, wherein the portion of the VR system conforms to a rear of the vehicle.

15. The system of claim 11, wherein the instructions, when executed by the processor, are further configured to cause the processor to retrieve the tracked action list.

16. The system of claim 11, wherein the tracked action list is customized for the driver.

17. The system of claim 11, wherein the instructions, when executed by the processor, are further configured to cause the processor to reset the positive index and the negative index prior to determining whether the one or more VR inputs trigger one or more driver actions or passenger actions.

18. The system of claim 11, wherein the instructions, when executed by the processor, are further configured to cause the processor to, prior to subtracting the negative index from the positive index:

multiply the negative index by a set negative index weightage; and multiply the positive index by a set positive index weightage.

19. The system of claim 11, wherein the instructions, when executed by the processor, are further configured to cause the processor to:

receive a response from the driver to the prompt; and when the response from the driver is in the affirmative, disable the portion of the VR system.

20. The system of claim 11, wherein the vehicle comprises the system.

* * * * *